(12) United States Patent
Suso et al.

(10) Patent No.: US 6,466,202 B1
(45) Date of Patent: Oct. 15, 2002

(54) INFORMATION TERMINAL UNIT

(75) Inventors: Koji Suso; Yukinobu Maruyama, both of Kokubunji; Takeshi Hoshino, Kodaira; Takeshi Minemoto, Sagamihara; Taisuke Kashima, Urawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/511,155

(22) Filed: Feb. 23, 2000

(30) Foreign Application Priority Data

Feb. 26, 1999 (JP) .......................... 11-051122

(51) Int. Cl.⁷ .......................... G09G 5/00; G09G 5/08; H04M 1/00
(52) U.S. Cl. .................. 345/169; 345/158; 345/173; 455/556; 455/566
(58) Field of Search .................. 345/1.1, 1.3, 2.3, 345/3.1, 4, 5, 87, 88, 901, 156, 168, 169, 158, 173, 864, 902, 903; 348/14.02, 14.03; 379/433.02–433.04; 455/556, 566, 557, 575

(56) References Cited

U.S. PATENT DOCUMENTS

| | | | | |
|---|---|---|---|---|
| 5,262,763 A | * | 11/1993 | Okuyama et al. | 345/87 |
| 5,414,444 A | * | 5/1995 | Britz | 345/156 |
| 5,491,507 A | * | 2/1996 | Umezawa et al. | 348/14 |
| 5,584,054 A | * | 12/1996 | Tyneski et al. | 455/89 |
| 5,646,649 A | * | 7/1997 | Iwata et al. | 345/173 |
| 5,673,170 A | * | 9/1997 | Register | 361/681 |
| 5,696,529 A | * | 12/1997 | Evanicky et al. | 345/126 |
| 5,710,576 A | * | 1/1998 | Nishiyama et al. | 345/169 |
| 5,896,575 A | * | 4/1999 | Higginbotham et al. | 455/566 |
| 5,933,783 A | * | 8/1999 | Kawakami et al. | 455/550 |
| 5,956,656 A | * | 9/1999 | Yamazaki | 455/575 |
| 6,069,648 A | * | 5/2000 | Suso et al. | 348/14 |
| 6,141,358 A | * | 11/2000 | Narayanaswamy et al. | 345/102 |
| 6,192,258 B1 | * | 2/2001 | Kamada et al. | 455/566 |
| 6,223,233 B1 | * | 4/2001 | Kavanaugh et al. | 710/73 |
| 6,259,932 B1 | * | 7/2001 | Constien | 455/556 |
| 6,278,884 B1 | * | 8/2001 | Kim | 455/556 |
| 6,327,482 B1 | * | 12/2001 | Miyashita | |

OTHER PUBLICATIONS

Japanese Patent Unexamined Publication No. 11-69214.
Japanese Patent Unexamined Publication No. 6-84334.
Japanese Patent Unexamined Publication No. 6-141306.
Japanese Patent Unexamined Publication No. 10-65780.

* cited by examiner

Primary Examiner—Bipin Shalwala
Assistant Examiner—Jeff Piziali
(74) Attorney, Agent, or Firm—Antonelli, Terry, Stout & Kraus, LLP

(57) ABSTRACT

A portable information terminal unit comprises a first and a second casing, a hinge means for coupling the first and second casing so that the first and second casing are rotatable relative to each other, an opening piercing though the first casing, a first see-thorough liquid crystal display part fitted in the opening, a means for detecting opening of the first and second casing, relative to each other, and a control means for reversing a display on the first see-through liquid crystal display part in response to a detection by the detecting means, wherein monochromatic information is displayed on the first see-through liquid crystal display part so as to reduce power consumption.

10 Claims, 8 Drawing Sheets

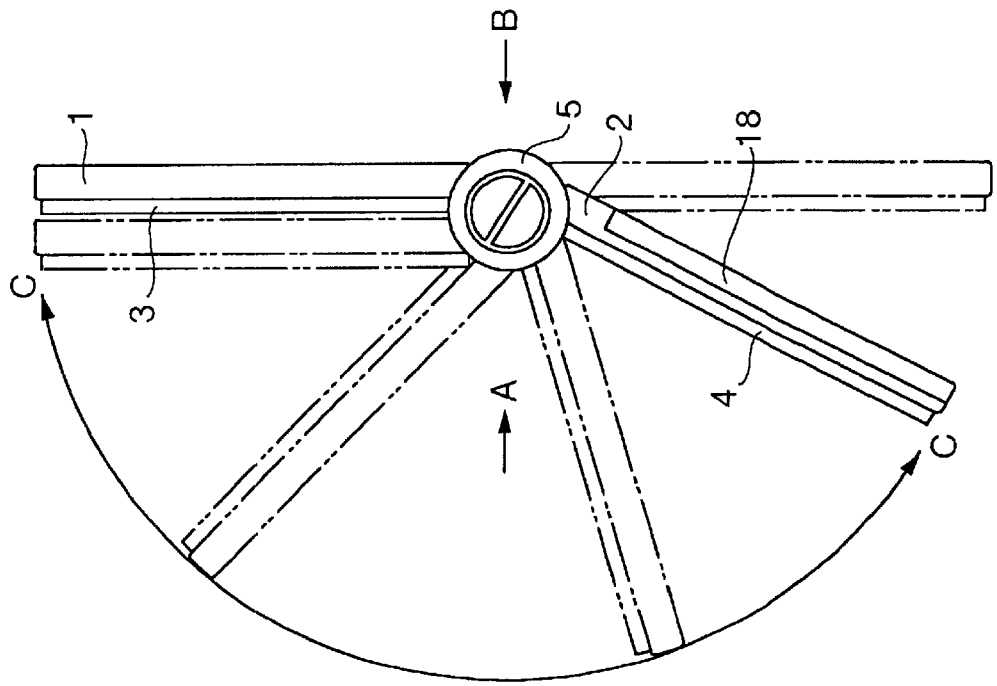
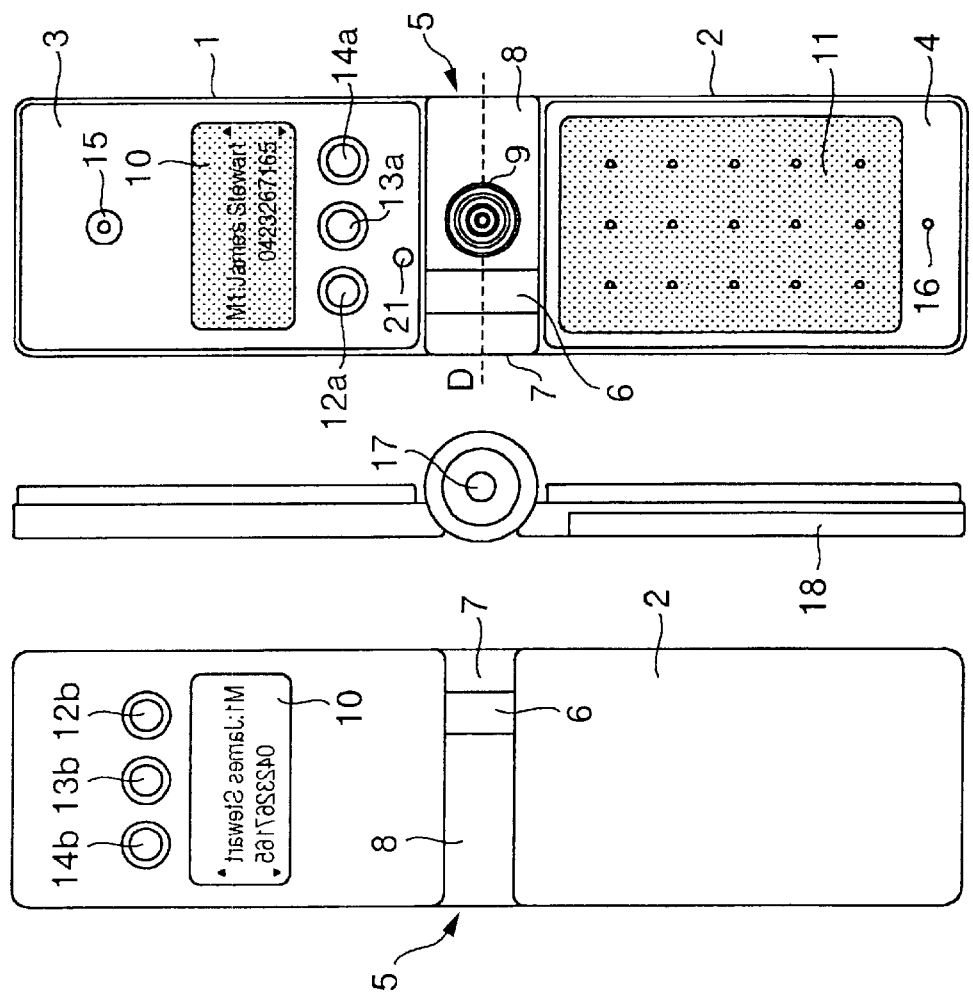

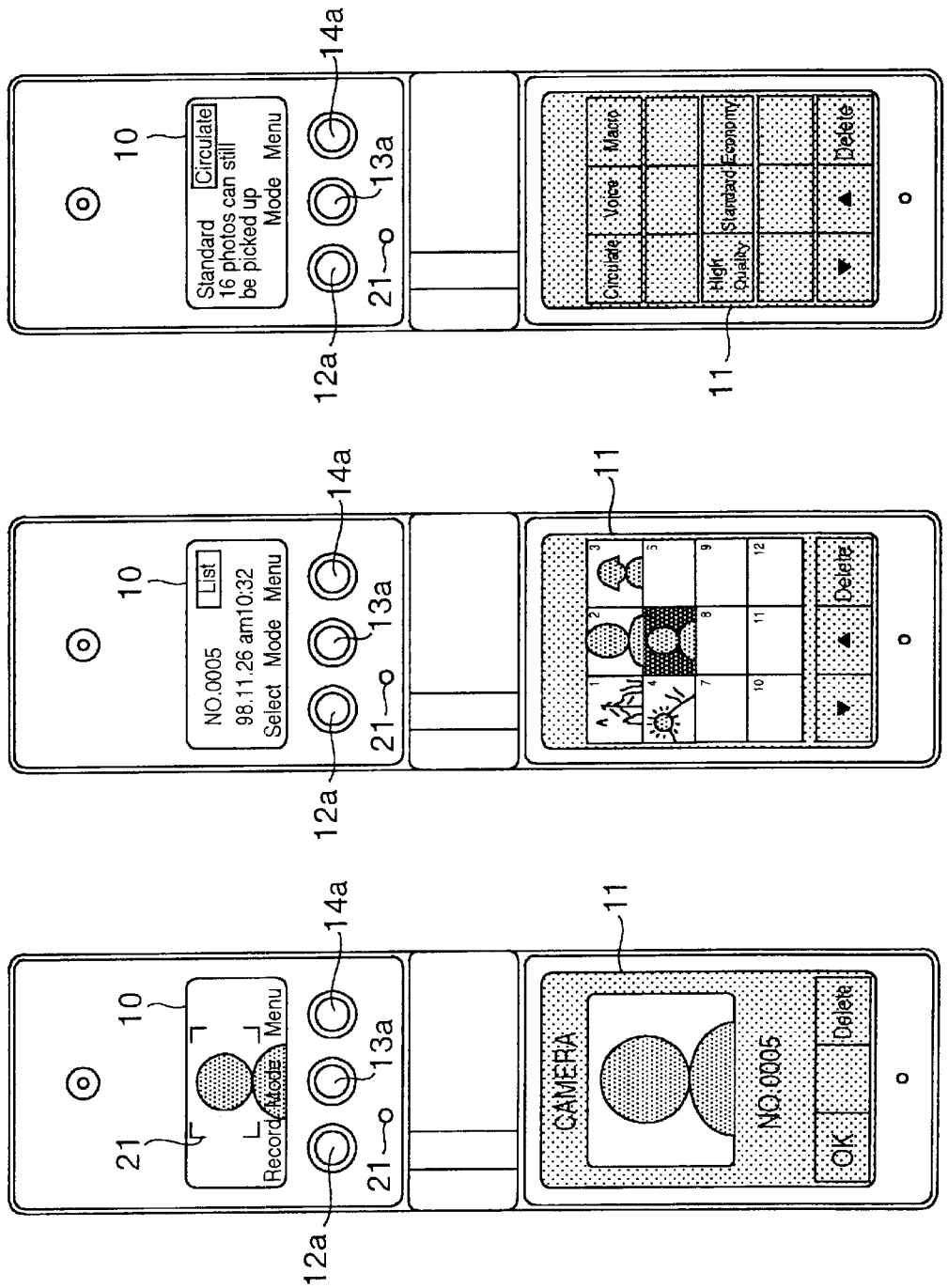

INFORMATION TERMINAL UNIT

BACKGROUND OF THE INVENTION

The present invention related to an information terminal unit, and in particular, to a portable information terminal unit of a foldable note-book type, having a plurality of functions.

As portable personal information terminal units, these days, there have been prosperously used electronic notes, electronic dictionaries, portable televisions, minidisk units, portable information communication units such as mobile terminal units including portable telephones which can transmit and receive information signals at remote positions.

Portable terminal units (PDA) have been known as portable information communication terminal units, which incorporate a transmitting and receiving function capable of transmitting and receiving image data, and among these portable information communication terminal units, the one is coupled to a portable telephone, that is, it can be separated from the latter, and the one is integrally incorporated with a portable telephone. These portable information communication terminal unit can transmit and receive not only image data but also voice data when it is used as a telephone.

In general, a notebook type portable information terminal unit is composed of two panels hinged to each other, and in use, after the panels are opened, a liquid crystal display unit provided on the inside of one of the panels is observed while keys or switches provided on the inside of the other one of the panels are manipulated. However, with the portable information terminal unit of this type, the liquid crystal display unit cannot be observed if the two panels are closed, and accordingly, a necessary minimum volume of information such as a power consumption of a battery for driving the information terminal unit or the present condition of information communication thereof cannot hardly be known from the outside thereof.

Further, portable information communication terminal units which carry out collection, processing, and transmission and reception of data as its main objects, at a destination and which can transmit and receive color image data have been more and more prosperous, and are now used in combination with a portable telephone so as to enable communication of both color image data and voice data. Some of them are used for talking with the other person while confirming the face of the other person. However, the portable information communication terminal units as mentioned above, are relatively bulky, and accordingly, are less portability.

Further, in such an arrangement that a portable terminal unit is used with a portable telephone, both portable terminal unit and telephone should be carried, and accordingly, the portability thereof is still less.

Accordingly, the applicant proposed, in order to solve the above-mentioned problems, an information communication terminal unit, as disclosed in Japanese Laid-Open Patent No. H9-226800, which comprises an upper and a lower casing which are rotatably attached to each other through the intermediary of a coupling part, liquid crystal display parts provided respectively on the upper and lower casing, on which image data and a touch panel are displayed, respectively, and a video-camera accommodated in the coupling part, the video-camera being rotatable, independent from the casings, so as to allow the video-camera to freely change its direction.

However, the above-mentioned information communication terminal unit has relatively high power consumption since two large size liquid crystal display parts are incorporated therein. Since this portable information communication terminal unit usually uses a battery as a power source, it is desirable to minimize power consumption as far as possible. Further, when information is received even on carrying of the portable information communication terminal unit, it cannot be confirmed unless the casings are opened in order to observe the content of the information displayed on the liquid crystal display part after the portable communication terminal unit is taken up. In view of the this fact, it has been desirable to confirm the content of information at one glance without opening the casings.

The present invention is devised in view of the above-mentioned problems, and accordingly, an object of the present invention is to provide a multi-functional information communication terminal unit which is excellent in portability, which can reduce the power consumption so as to be convenient in use.

SUMMARY OF THE INVENTION

To the end, according to a first aspect of the present invention, there is provided a portable information terminal unit comprising a first and a second casing, a hinge means coupling the first and second casings with each other so that the first and second casing are relatively rotatable with respect to each other, an opening piercing through the first casing, a see-through first liquid crystal display part fitted in the opening, and a manipulation part incorporated in the second casing, a means for detecting an opening of the first and second casing, a control means for reversing a display on the see-through first liquid crystal display part in response to a detection by the detecting means.

According to the second aspect of the present invention, there is provided a portable information terminal unit comprising a first and second casings, a hinge means for coupling the first and second casing with each other so that the first and second casing are relatively rotatable with respect to each other, an opening piercing through the first casing, a see-through first liquid crystal display part fitted in the opening, and a second liquid crystal display part provided in the second casing, a means for detecting an opening of the first and second casings, and a control means for reversing a display on the see-through first liquid crystal display part in response to a detection by the detecting means.

According to a specific embodiment of the second aspect of the present invention, the first and second casing are set in such a relationship that the see-through first liquid crystal display part is superposed with the second liquid crystal display part at least in part of the latter when the first and second casing are closed being mated with each other.

With this arrangement, even though the first and second casing are closed being superposed with each other, information displayed on the see-through first liquid crystal part can be observed from the outside. Further, information displayed on the second liquid crystal display part can be observed through the see-through first liquid crystal display part. Thus, it is possible to eliminate the necessity of opening the casings in order to confirm the content of the information, Further, a small-sized liquid crystal display panel is used in the see-through first liquid crystal display part, and accordingly, no relatively high power is required for a display on the see-through liquid crystal display part.

Further, according to another specific embodiment of the second aspect of the present invention, the see-through first liquid crystal display part is monochromatic, and the second liquid crystal display part is multicolored.

In this specific embodiment, a large-sized high power consumption multi-colored liquid crystal display part is provided on one of the casings, and a small-sized lower power consumption monochromatic liquid display part is provided on the other one of the casings, and accordingly, information which can be monochromatically displayed is displayed on the see-through liquid crystal display part without using the multicolored liquid crystal display part, thereby it is possible to reduce the power consumption. Further, even though the casings are superposed with each other, that is, are closed, the multicolored liquid crystal display part can be observed through the see-through liquid crystal display part, thereby it is possible to observe not only an information displayed on the see-through liquid crystal display part but also an information displayed on the multicolored liquid crystal display part.

Further, according to another specific form of the second aspect of the present invention, a video camera is incorporated in the above-mentioned coupling part so as to be rotatable, independent from the first and second casing, and accordingly, the direction of the video-camera can be freely changed. According to the present invention, since the video-camera whose direction can be freely changed, is provided, an image from an object located in an arbitrary direction can be picked up, irrespective of the opening or closing of the above-mentioned casings. Further, during pick-up of an image, if the first and second casing are opened, the above-mentioned see-though liquid crystal display panel can be used as a finder for the video-camera, thereby it is possible to enhance the convenience thereof in use.

BRIEF DESCRIPTION OF THE DRAWINGS

FIGS. 1a to 1d are views illustrating a portable information communication terminal unit in the form of a preferable embodiment of the present invention, among those, FIG. 1a is a rear view, FIG. 1b is a side view , FIG. 1c is a front view and FIG. 1d is a side view in which the portable information communication terminal unit is opened at an arbitrary angle;

FIGS. 2a to 2c are front views illustrating the portable information communication terminal unit shown in FIG. 1a, in different display conditions;

FIGS. 5a to 5c are views illustrating the portable information communication terminal unit shown in FIG. 1a, in such a condition that it is used as camera in different operation modes;

FIGS. 6a and 6b are a side and a front view for explaining a finder function of a see-through liquid crystal display part in the portable information communication terminal unit shown in FIG. 1a, in the camera mode shown in FIG. 5a;

DESCRIPTION OF THE PREFERRED EMBODIMENTS

Figure 2A:
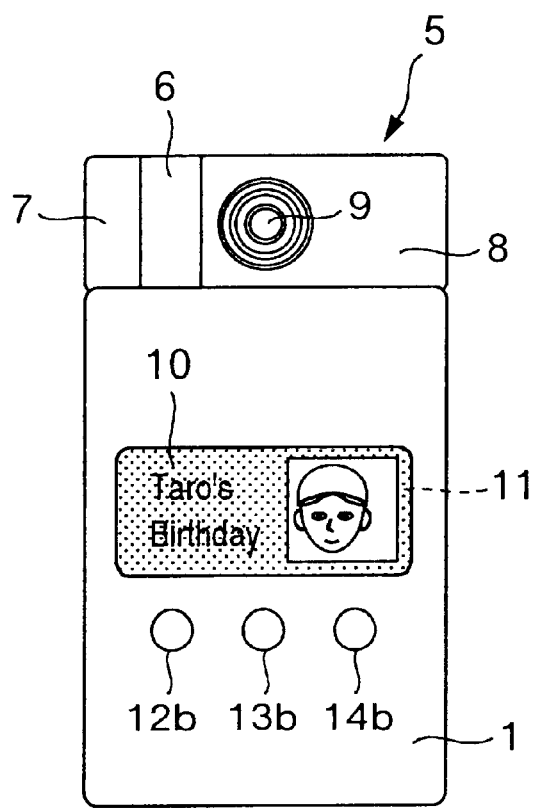

Detailed explanation will be made of an embodiment of the present invention with reference to the drawings.

Referring to FIGS. 1a to 1d which show an embodiment of a portable information and communication terminal unit according to the present invention, there are shown outer casings 1, 2, inner casings 3, 4, a coupling part 5, a rotary shaft support part 6, a rotary shaft 7, an accommodation member 8, a camera lens 9, a see-through liquid crystal display part 10, a multicolored liquid crystal display part 11, manipulation keys 12a, 12b, 13a, 13b, 14a, 14b, a speaker 15, a microphone 16, a power source switch 17, a battery accommodation part 18 and an opening and closing detecting switch 21.

At first, specifically referring to FIGS. 1a to 1d, the rotary shaft 7 provided to the outer casing 1 and the rotary support part 6 provided to the outer casing 2 constitute a hinge structure, and accordingly, the outer casings 1, 2 can be opened and closed as a notebook, as indicated by the arrow C in FIG. 1d. Further, the rotary shaft support part 6 is rotatably attached on the side remote from the rotary shaft 7, with the accommodation member 8 in which a thin video camera and a circuit board mounted thereon with a circuit for processing output signals from the video camera are accommodated. Further, the accommodation member 8 is formed in a part thereof with a hole in which the camera lens 9 is fitted. AS clearly understood from FIGS. 1a to 1d, there are presented no parts projecting from the accommodation member 8.

Further, the outer casing 1 is mounted thereon with the inner casing 3 while the outer casing 2 is mounted thereon with the inner casing 4, and on the outer casing 1 side, an opening is formed having a small area and piercing through the outer casing 1 and the inner casing. A see-through liquid crystal display part 10 is fitted in the opening. A multicolored liquid crystal display part 11 having a large area is mounted on the inner casing 4. In the see-through liquid display part 10, transparent liquid crystal is used, and accordingly, through this see-through liquid crystal display part 10, the front side can be seen from the rear side as shown in FIG. 1a, and the rear side can be seen from the front side as shown in FIG. 1c.

Figure 2B:
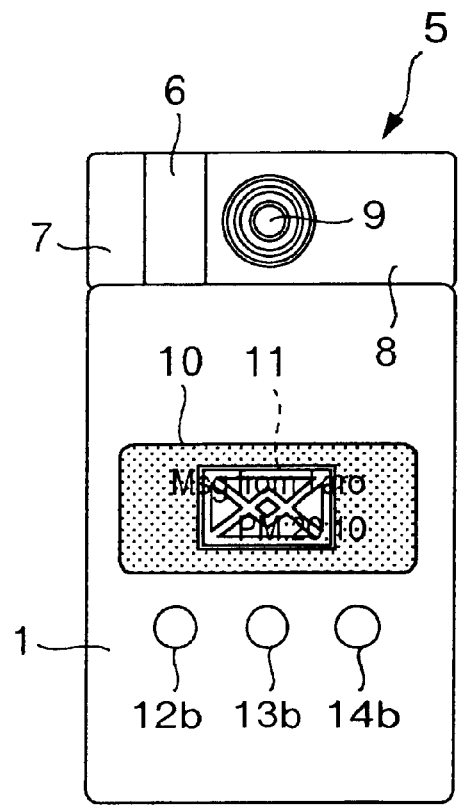

The manipulation keys 12a, 13a, 14a are provided on the front surface of the inner casing 3, for example, at positions below the see-through liquid crystal display part 10, and the manipulation keys 12b, 13b, 14b respectively having the same functions as those of the manipulation keys 12a, 13a, 14a are provided on the outer surface of the outer casing 1 at positions above the see-through liquid crystal display part 10. These manipulation keys 12b, 13b, 14b are adapted to be manipulated so as to perform the same functions as those of the manipulation keys 12a, 13a, 14a when the outer casings 1, 2 are closed. AS shown in FIGS. 2a and 2b, when the outer casings 1, 2 are closed, the manipulation keys 12b, 13b, 14b respectively corresponding to the manipulation keys 12a, 13a, 14a are located with respect to the see-through liquid crystal display part 10 in a relationship similar to that of the manipulation keys 12a, 13a, 14a with respect to the see-through liquid crystal display part 10 when the outer casings 1, 2 are opened, as shown in FIG. 1c.

It is noted that operating functions of the manipulation keys 12a, 13a, 14a are displayed on the see-through liquid crystal display part 10 in the vicinity of the keys 12a, 13a, 14a, respectively, and accordingly, these keys 12a, 13a, 14a can be used as multifunctional keys for various purposes.

Further, as shown in FIG. 1c, the speaker 15 (or an earphone jack) is provided in the inner casing 3 above the see-through liquid crystal display part 10, and a microphone 16 is provided in the inner casing 4 below the multicolored liquid display part 11. Further, the rotary shaft 7 is provided with the power source switch 17, and the outer casing 2 is provided with the battery accommodation part 18 in which a battery for driving the information communication terminal unit is accommodated.

Although it is not shown, an extendable antenna is provided so that communication can be made with a remote station through this antenna.

A multi-colored liquid crystal display part 11 can display data or an image such as animage picked up by the videocamera accommodated in the coupling part 5, still images or animation stored in memory provided in the inner casing 4, or information such as a sentence consisting of characters. Further, the see-through liquid crystal display part 10 can display information such as strings of characters or marks which can indicate a charged condition of the battery, a present status of this portable information communication terminal unit,such as information as to whether a singal is received or not on the portable information communication terminal unit, and the like. further, this see-through liquid crystal display part 10 can display a simple sentence.

A multi-colored liquid crystal display panel having a high degree of definition is used in the multicolored liquid crystal display part 11 in order to obtain high quality multicolored display images. When an image is displayed on such a multi-colored liquid crystal display part 11, a CPU incorporated in the inner casing 4 controls the display of the image with the use of a frame memory. Accordingly, a content stored in the frame memory is displayed on the multicolored liquid crystal display part. In the case of displaying animations or even strings of characters, that is, sentences, on the multi-colored liquid crystal display part, if contents to be displayed are changed by scrolling or the like, the CPU rewrites a content in the frame memory each when the contents to be displayed are changed. Further, this frame memory has a large capacity so as to require a relatively large power, and accordingly, when an image such as an animation whose content varies is displayed on the multicolored liquid crystal display part 11, the power consumption becomes large, resulting in occurrence of unpreferable problems if a battery is used as its power source.

In order to eliminate the above-mentioned problems, in this embodiment, an inexpensive see-through liquid crystal display part 10 having a lower power consumption is used, and accordingly, a present status of the portable information communication terminal unit or a short sentence is displayed on this see-through liquid crystal display part. In this case, by turning on the power source switch 7 so as to energize the information communication terminal unit, a string of characters or a mark indicating a condition of the battery is displayed on the see-through liquid crystal display part. Further, when signals are received, the contents of the signals are displayed on the see-through liquid crystal display part, instead of the information having the content of the condition of the battery.

This see-through liquid crystal is small-sized, and is adapted to monochromatically display characters thereon. Thus, the capacity of memory used in this indication becomes less, and accordingly, the power consumption thereof can become extremely low. The information indicating the present status of the information communication terminal unit may be displayed in an extremely small area, and accordingly, even though signals are frequently received so that the memory should be frequently rewritten in order to display the contents thereof on the see-through liquid crystal display part 10, the power consumption does not become extremely large. Further, even the information with which a condition of the battery is indicated, varies only when the charged voltage remaining in the battery becomes abnormally lower, and accordingly, the information is substantially displayed in the form of a still image. Thereby it is possible to further lower the power for displaying the information on the see-through liquid crystal display part 10.

The rotary shaft 7 which is rotatably attached to the rotary shaft support part 6 is fitted thereon with the accommodation member 8 which is therefore rotatable around the center axis D of the rotary shaft 7. When the accommodation member 8 is rotated by finger tips or the like, relative to the rotary shaft 7, the direction of the video camera accommodated in the accommodation member 8, that is, the direction of the camera lens 9 can be changed over an angle of 360 deg. around the center axis D of the rotary shaft 7.

Referring to FIGS. 2a and 2b, which show the casings 1, 2 in this embodiment, in such a condition that they are closed, the see-through liquid crystal display part is superposed in its entirely with a part of the multi-colored liquid crystal display part 10 shown in FIG. 1c. That is, with this arrangement in which the see-through liquid crystal display part 10 is fitted on the outer casing side, the part of the multicolored liquid crystal display part 11 can be observed through the see-through liquid crystal display part 10.

Thus, whenever a mail is received even though the casings 1, 2 are closed, the indication informing that a signal has been received, that is, a mail address or a telephone number of a sender or a simple content of a mail is displayed on the see-though liquid crystal display part 10, and further, in such a case that an image is transmitted together with the mail, this image is displayed on the multi-colored liquid crystal display part 11 so as to be visible through the see-through liquid crystal display part 10 as shown in FIG. 1c.

Referring to FIG. 2c, a simple content of a mail, that is, "Taro's birthday" is displayed on the see-through liquid crystal display part 10 while a photographic image is displayed on the multi-colored liquid crystal display part 11, which is preferably prevented from being superposed with the content of the mail indicated by a string of characters. Further, as shown in FIG. 2b, a simple content of a mail, that is, "Msg from Taro pm 20:10" is displayed on the seethrough while a mail mark is displayed on the multicolored liquid crystal display part 11. In this case, the image can be easily recognized even though it is overlapped with the content of the mail.

Even though the casings 1, 2 are closed as mentioned above, the direction of the video-camera, that is, the direction of the camera lens 9 can be freely changed by rotating the accommodating member 8 by finger tips or the like.

In such a case that the information of indication displayed on the see-through liquid crystal display part 10 is observed while the casings 1, 2 are closed, in the direction as viewed in FIG. 2a, as clearly understood in FIG. 1a, the direction of the indication displayed on the see-through liquid crystal display part 10 is vertically reversed when it is observed outside of the outer casing 1 in such a case that the casings 1, 2 are opened. Accordingly, the direction of the information of the indication displayed on the see-through liquid crystal display part 10 should be automatically reversed when the casings 1, 2 are closed. Accordingly, the opening and closing detecting switch 21 is provided, and the CPU incorporated in the portable information communication terminal unit controls the reversal of the information of the indication in accordance with an operation of the opening and closing detection switch 21.

In this embodiment, in the above-mentioned used conditions (functions), the used conditions can be further changed into any of a camera mode, a portable telephone mode or a smart phone. If the used conditions are changed from one to another, the manipulation keys 14a, 14b are used as change-over means. That is, they serve as function keys.

Figure 3A:
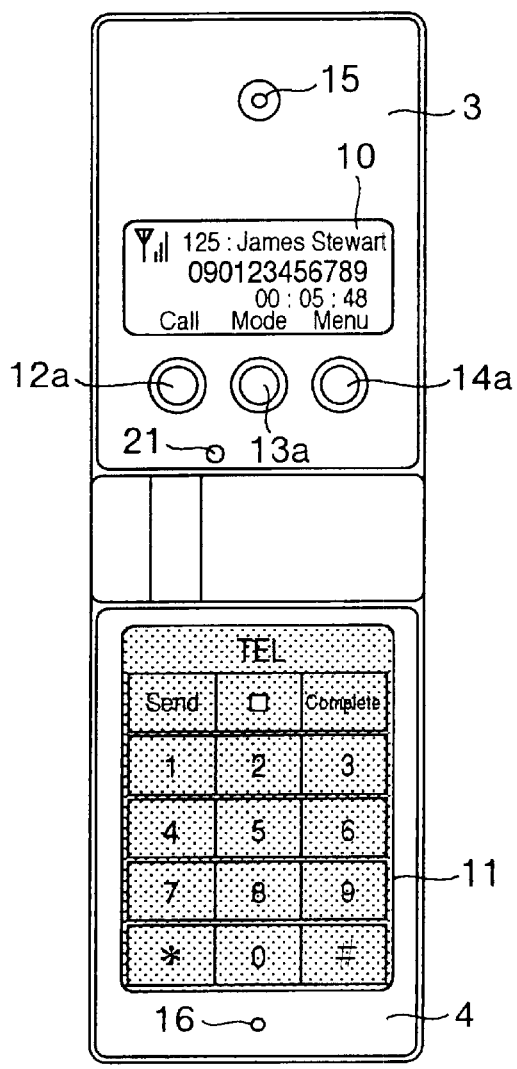
FIGS. 3a and 3b are front views illustrating the portable information communication terminal unit shown in FIG. 1a, in such a condition that it is used in different operation modes.

In this embodiment, as a certain mode, if the power switch 17 is turned on, the portable information communication unit can be automatically set into a portable telephone mode. Referring to FIG. 3a, a telephone sending mode in the used condition in which it is as a portable telephone, is shown. In this figure, like reference numerals are used to denote like parts to those in the figures mentioned before.

Referring to FIG. 3a, a telephone manipulation part in the form of a touch key board such as a ten key board is displayed on the multicolored liquid crystal display part 11 in this mode. When the keys on this key board are successively touched so as to enter a telephone number of the other party, the entered telephone number such as "090123456789" of the other party, and as well, the name "James Stewart" of the third party corresponding to the telephone number are displayed on the see-through liquid crystal display part 10 together with the present time or a time length of a telephone call. In this arrangement, after confirmation on the entry of the proper telephone number, a "sending" key displayed on the multicolored liquid crystal display part 11 is touched, calling for the other party can be carried.

Figure 3B:
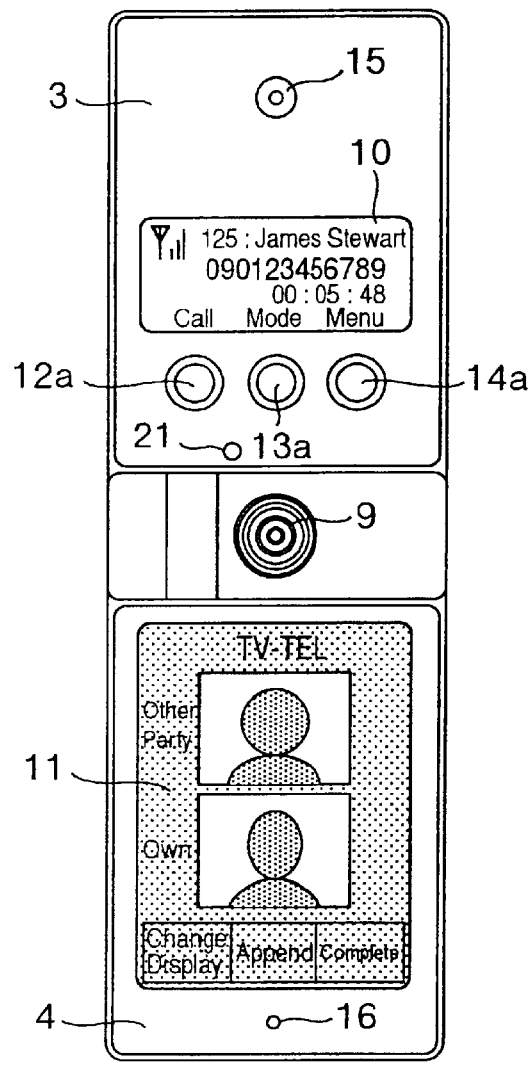

It is noted that the manipulation key 12a serves as a call key which is used when an already registered telephone number is read out. After a response is received from the other party, if the third party uses a television telephone, the portable information communication terminal unit is automatically set in a television telephone mode as shown in FIG. 3b, but if the third part does not use the television telephone, the mode shown in FIG. 3a is held so as to enable telephone conversation. This telephone conversation is carried out through the microphone 16 and the speaker 15. When a "completion" key displayed on this multicolored liquid crystal display part 11 is touched, the telephone conversation is completed.

Further, when a mode key 13a is manipulated so as to shift the operation mode into a television telephone mode, an image from the other party is displayed on the multi-colored liquid crystal display part 11, as shown in FIG. 3b. Further, an image picked up by the video camera is displayed thereon, and accordingly, the direction of the vide cameral, that is, the direction of the cameral lens 9 is turned to the user himself, an image picked up from the user can be displayed on the multicolored liquid crystal display part 11, and it is simultaneously send to the other party.

In this television telephone mode, when the "completion" key displayed on the multicolored liquid crystal display part 11 is touched, the operation mode is returned into the telephone sending mode shown in FIG. 3a, and accordingly, the telephone conversion is completed. Further, each time when a "display change-over" key displayed on the multi-colored liquid crystal display part 11 is touched, the display of images picked up from the other party and the user himself, the display of an image picked up from the other party, the display of an image picked from the user himself, the display of images from the other party and the user himself as mentioned at first are successively selected in the mentioned order. It is noted that the display on the see-through liquid crystal display part 10 is the same as that in the case of the telephone sensing mode as shown in FIG. 3a.

It is noted, that when a signal is received from the third party in the telephone sending mode shown in FIG. 3a, the display explained with reference to FIGS. 1a to 2b is effected.

In this arrangement, each time when the manipulation key 14a which serves as a menu key is manipulated, the camera mode, the smart phone mode and the telephone sending mode and the camera mode first mentioned are successively selected in the mentioned order.

When the menu key 14a is manipulated in the portable telephone sending mode as shown in FIG. 3a, the operation mode is shifted into the camera mode. It is noted that the operation mode cannot be shifted during telephone conversation, and accordingly, even though the menu key 14a is manipulated in the television telephone mode as shown in FIG. 3b, the television telephone mode is still maintained.

Figure 4:
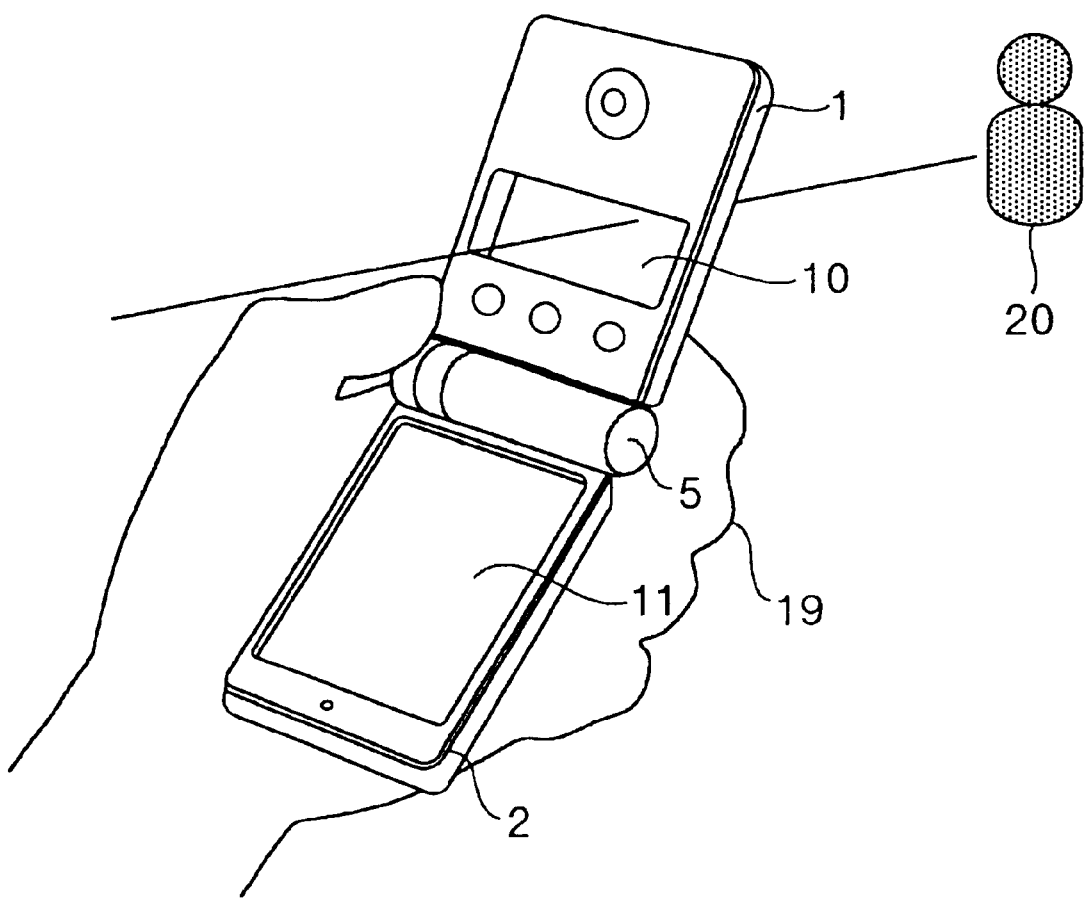
FIG. 4 is a view illustrating the portable information communication terminal unit shown in FIG. 1a, in such a condition in which it is used as a camera.

Referring to FIG. 4 illustrating a using method in which the use condition is set in the camera mode, there are shown a human hand 1 and an object 20. In this figure, like reference numerals are used to denote like parts to those shown in the figures mentioned above.

Referring to this figure, in the case of this use condition, the portable information communication terminal unit is carried by the single human hand 19 after the outer casings 1, 2 are opened at a predetermined angle, and the video camera (which is not shown in this figure) provided in the coupling part 5 is directed to the object 20, and accordingly, an image can be picked from the object 20. In this case, no information is displayed on the see-through liquid crystal display part 10, and accordingly, the object 20 can be looked up through this see-through liquid crystal display part 10 which is transparent. An image picked up from the object 20 by the video camera is displayed on the multicolored liquid crystal display part 11.

FIGS. 5a to 5c show operation modes in such a used condition that the portable information communication terminal unit is used as a camera.

FIG. 5a shows an image pick-up mode in which the portable information communication terminal unit is used as shown in FIG. 4a. In this case, the see-through liquid crystal display part 10 serves as a finder of the camera. Accordingly, a telescopic display 21 used for providing a criteria to the image pick-up range can be made.

Figure 6B:
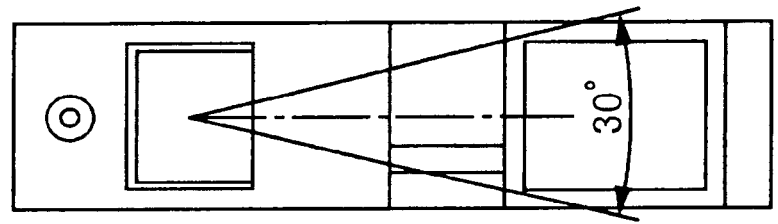
Figure 6A:
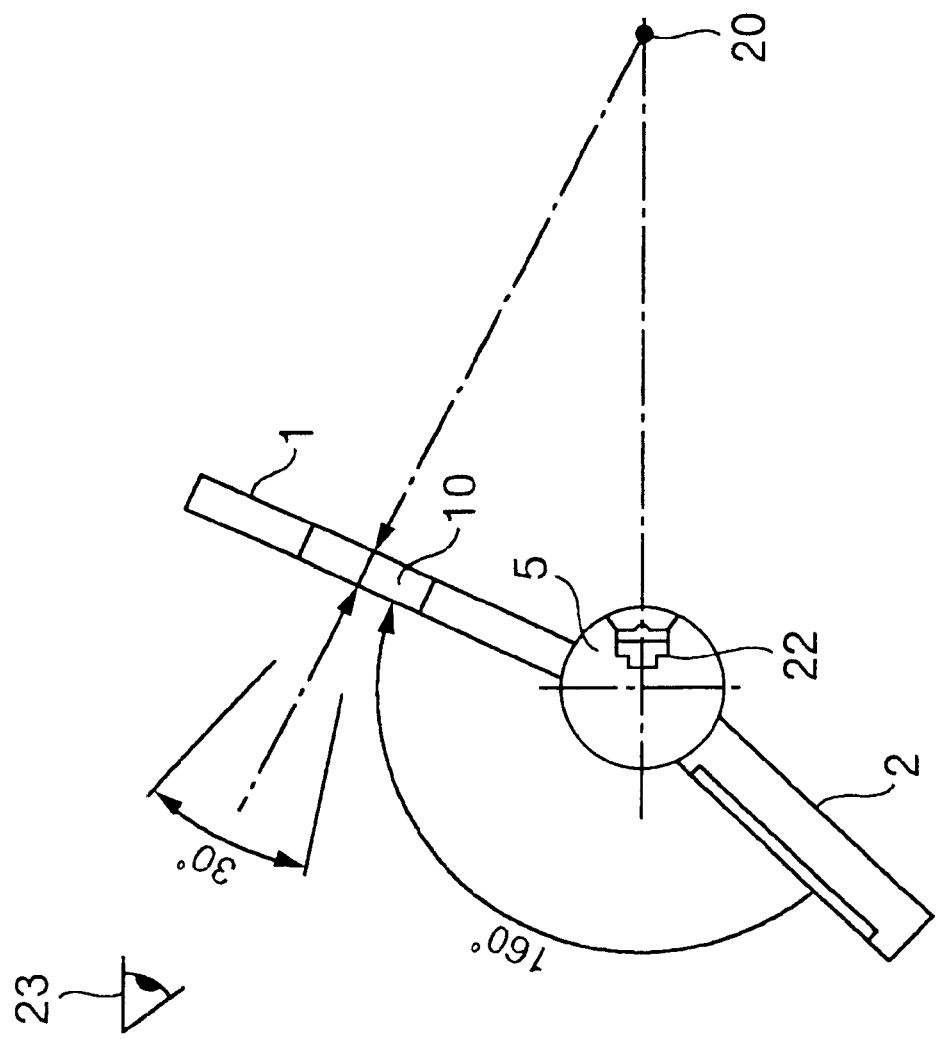

When this image pick-up mode is set, as shown in FIG. 6a, the casings 1, 2 are latched at a predetermined angle, for example, 160 deg. by means of a latch mechanism 22 provided in the coupling part 5, and an image is picked up in this condition. Further, there may be provided a filter (for example, an electronic filter or a sheet type filter) for limiting the viewing field on the outer surface of the see-through liquid crystal display part 10. Accordingly, as shown in FIG. 6a, the extent with which the object 20 can be seen through the see-through liquid crystal display part 10, is set, that is, for example, angles of +/− deg. with respect to a horizontal plane passing through the center of the see-through liquid crystal display part 10, as shown in FIG. 6a, and angles of +/− 15 deg. with respect to a vertical plane passing through the center of the see-through liquid crystal display part 10, as shown in FIG. 6b. Thus, if the eye 23 is deviated from this extent, the object 20 cannot be seen through this see-through liquid crystal display part 10. With this limitation to the viewing field, the condition in which the object 20 is observed through the see-through liquid crystal display part 10 becomes always uniform, and accordingly, the see-through liquid crystal display part 10 can serve as a finder. That is, an image displayed on the multicolored liquid crystal display part 11 is in extend substantially corresponding to that within which the object can be observed through the see-through liquid crystal display part 10.

Referring to FIG. 5a, the manipulation key 12a serves as a recording key in this case.

Then this recording key 12a is manipulated, an picked-up image frame at this time is stored in the memory. Accordingly, each time when the recording key 12a is manipulated, images in respective frames are successively stored in the memory. In this case, the memory should have a large capacity. Thus, in this embodiment, the portable information communication terminal unit is connected to a server incorporating memory of a large capacity through radio communication, and accordingly, when the recording key 12a is manipulated, an image in a single frame is transmitted into the server and is stored in the memory at a predetermined address within the server. In this case, together with this image, data as to a number of the image and recording data are also recorded. For example, as shown in FIG. 5a, the number of the image is displayed with a number "No. 0005".

The manipulation key 13a also serves as a mode key for changing over the cameral mode. That is, each time when the manipulation key 13a is manipulated, a confirmation/search mode, a setting mode, an image pick-up mode and the confirmation/search mode mentioned at first are successively selected in the mentioned mode. In the image pick-up mode shown in FIG. 5a, when this mode key 13a is manipulated, the operation mode is shifted into the confirmation/search mode shown in FIG. 5b. In this confirmation/search mode, the images recorded as mentioned can be confirmed or searched for. When the change-over is made from FIG. 5a, at first as shown, the images stored up to the present time are displayed (in a thumb-nail list-up display). In this case, a designated image is displayed in a half-tone dot meshing, and simultaneously, by touching either one of a "▲" touch key and a "▼" touch key which are also displayed, the image to be designated can be changed. In such a case that all images cannot be displayed in this list-up display, either the "▲" touch key or the "▼" touch key is continuously touched so that the half-tone dot meshing is squeezed against the upper or lower edge of the list-up display in order to scroll the list-up display. Further, a number and a recording date of a designated image can be displayed on the see-though liquid crystal display part 10. Further, in this mode, the manipulation key 12a serves as a display change-over key.

As mentioned above, a desired image is designated by the half-tone dot meshing, and then the display change-over key 12 is manipulated, the above-mentioned designated image alone is displayed over the entire area in which the list-up display has been made on the multicolored liquid crystal display part 11. In such a image display, when the display change-over key 12 is manipulated, the original list-up display is again exhibited. Further, if a "delete" touch key displayed on the multicolored liquid crystal display part 10 in this list-up display exhibition is touched, a designated image in the list-up display is deleted. Thus, it is possible to an image which has been unnecessary can be deleted.

Thus, the confirmation of recorded images and the search therefor can be made. In this confirmation/search mode, if the mode key 13a is manipulated, the operation mode is shifted into the setting mode shown in FIG. 5c. This setting mode is adapted to set a pick-up condition of the camera or the like, and accordingly, all set-up conditions are displayed, being listed up while the selected set-up condition is displayed by the half-tone dot meshing. Further, similar to the confirmation/search mode, the selected condition can be changed or the list-up display can be scrolled up by manipulating the "▲" touch key or the "▼" touch key.

Further, the content of a selected set condition and an additional information thereto are displayed on the see-through liquid crystal display part 10. In the condition as shown, the image quality is set to "standard", and in addition to this, an additional information indicating a number of images which can be stored in the memory, that is, for example, "Fifteen images can be still picked up" is displayed thereon.

In this setting mode, if the mode key 13a is manipulated, the operation mode is shifted into the image pick-up mode shown in FIG. 5a. Accordingly, before an image is picked up, the setting mode shown in FIG. 5c is effected by manipulating the mode key 13a, and a predetermined pickup condition is set up. Accordingly, an image can be picked up in a predetermined condition. Further, by setting the setting mode shown in FIG. 5c, the number of images which can be stored in the memory can be known. Further, after the confirmation/search mode is set, an necessary stored image can be deleted by manipulating the "▲" touch key or the "▼" touch key and the "delete" touch key. Further, a stored image can be edited after the images are stored.

In a camera using condition shown in FIGS. 5a to 5c, when the menu key 14a is manipulated, the operation mode is shifted into a smart phone using mode as shown in FIGS. 7a to 8c. At this time, the operation mode is at first shifted into a mail preparing mode shown in FIG. 7a. In this mail preparing mode, a manipulation part composed of character keys and touch keys, for preparing a mail is displayed on the multicolored liquid crystal display part 11, and accordingly, a mail can be prepared by touching the character keys. During this mail preparation, Kana characters, alphanumeric characters or symbolic marks can be selected. The content of the prepared mail is displayed on the see-through liquid crystal display part 10, and accordingly, the content of the mail can be confirmed.

At this stage, the manipulation key 12a serves as a memory key, and accordingly, after a desired mail content is obtained, the content is stored in the memory by manipulating the memory key 12a. Further, the content of the mail can be stored in a memory area in the server which is designated to the portable information communication terminal unit. Another portable information communication terminal unit can access this memory area. Thus, the mail can be sent to an operator for this another portable information communication terminal unit.

Figure 7A:
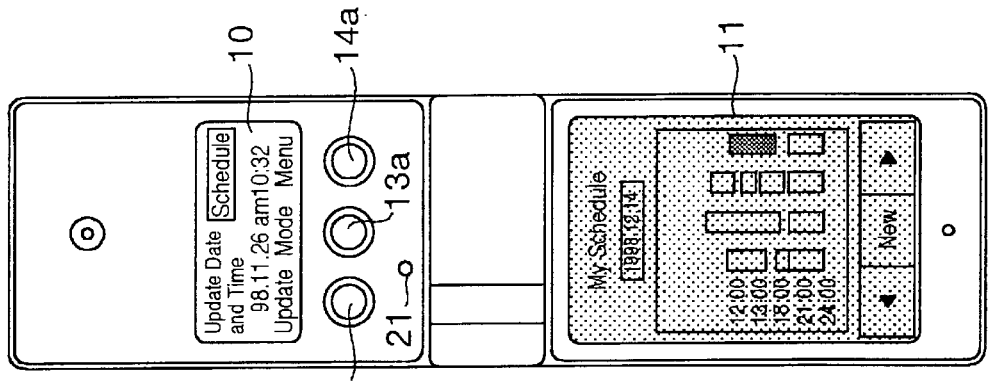
FIG. 7a to 7c are front views illustrating the portable information communication terminal unit shown in FIG. 1a, in such a condition that it is used as a smart phone in different operation modes.
Figure 7B:
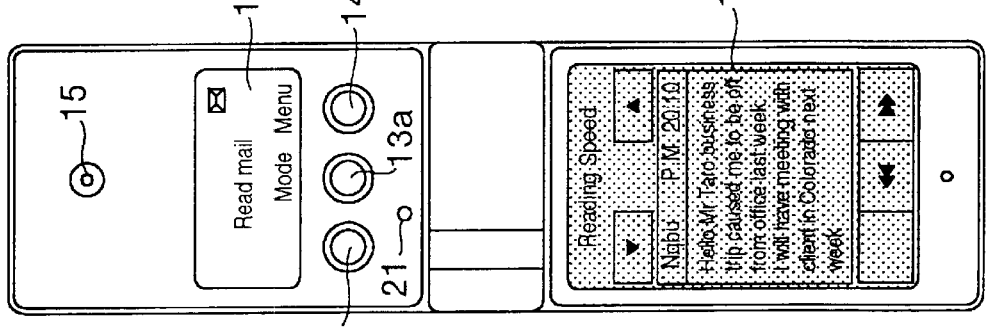
Figure 7C:
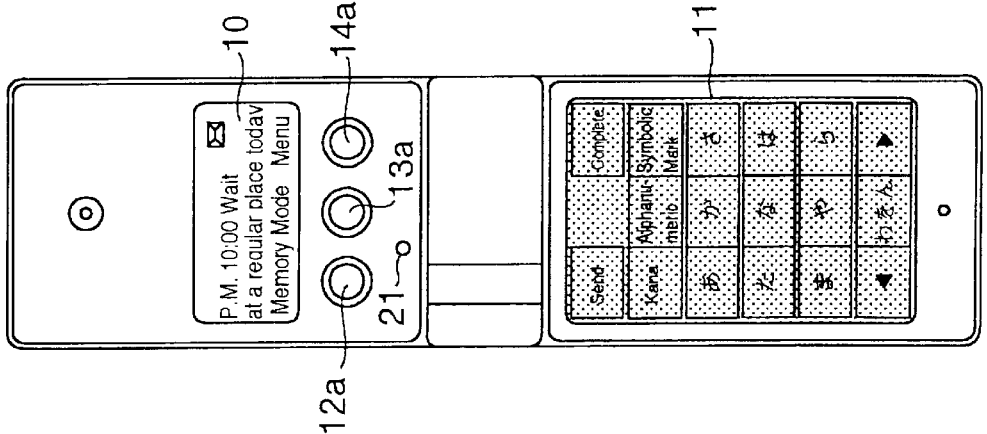

When the mode key 13a is manipulated in the mail preparing mode shown in FIG. 7a, the operation mode is shifted into a mail receiving mode shown in FIG. 7b. In this mode, by this information communication terminal unit, a mail stored in a memory area designated to another portable information communication terminal unit in the server, as mentioned above, is read, and the reading is carried out by voice through the intermediary of a speaker 15, and the content of the mail is displayed on the multicolored liquid crystal display part 11. During reading of the mail, adjustment for increasing and decreasing the speed of reading can be made by using the "▲" touch key or the "▼" touch key, and further, a pause in reading, and retuning or advancing of reading can be made by using a "crosswise triangular mark/two vertical bar mark" key, "two rightward triangular mark" key or "two leftward triangular mark" key.

When the reading of the mail stored in the server is completed, the reading of the mail is repeated again. Further, if the mode key 13a is manipulated in this mail receiving mode, the operation mode is shifted into a schedule managing mode shown in FIG. 7c. In this mode, a schedule for the operator himself is prepared, and the thus prepared schedule is displayed on the multicolored liquid crystal display part 11. In this case, the manipulation key 12a serves as an update key. By manipulating this update key 12a, a part of the schedule which have bee already prepared can be updated, and further, by touching a "new entry" key, a new schedule can be added. The thus updated schedule and a newly entered schedule are sent into a memory area in the server, which is designated for the portable information communication terminal unit, and this memory area can be informed to an operator having a portable information communication terminal unit which can access this memory area.

Figure 8A:
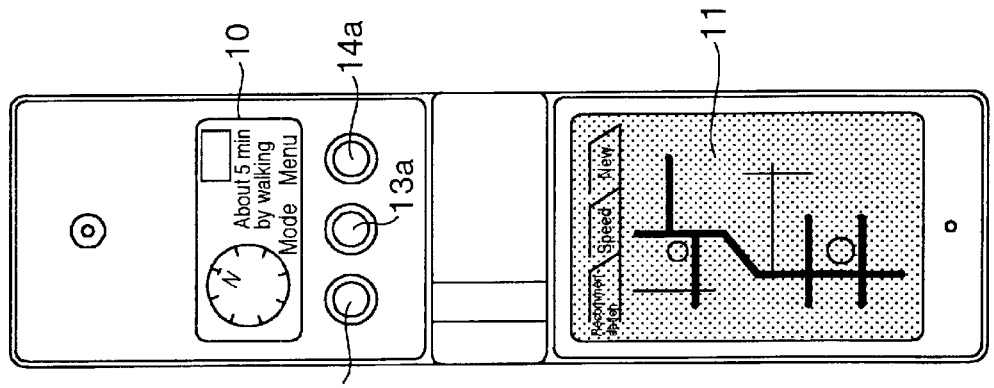
FIGS. 8a to 8c are front views illustrating the portable information communication terminal unit shown in FIG. 1a, which is used as a navigation device in such a condition that it is used in different operation modes.
Figure 8B:
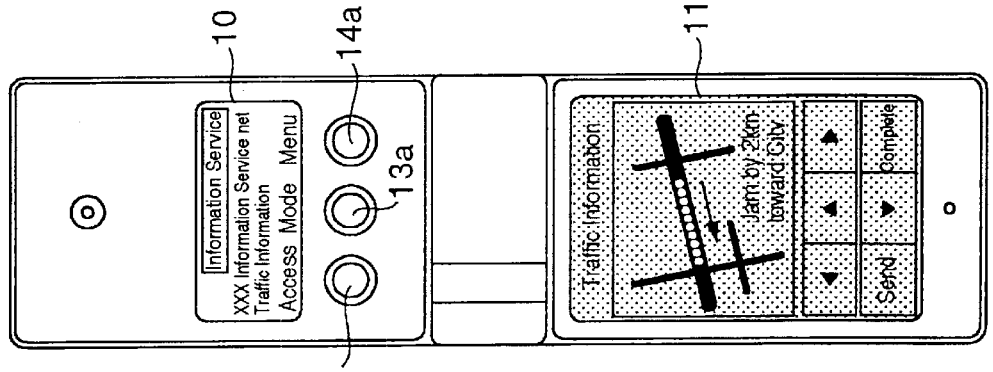
Figure 8C:
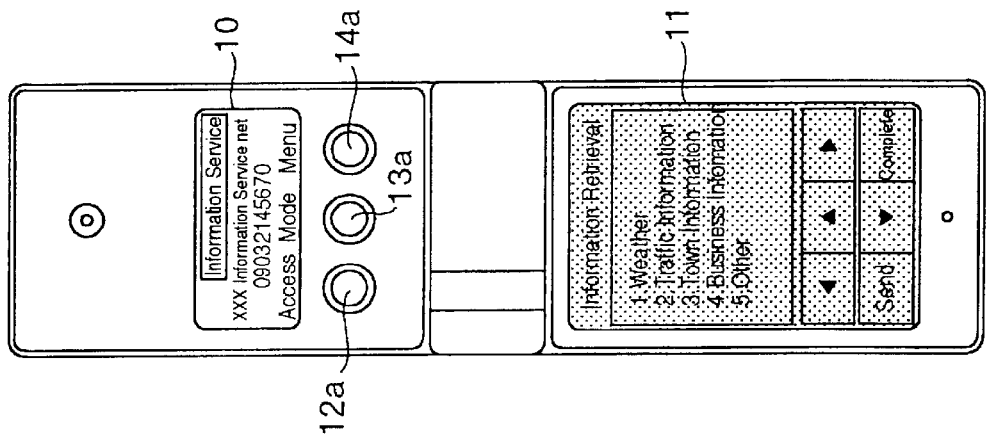

In this schedule managing mode, when the mode key 13a is manipulated, the operation mode is shifted into an information acquiring mode shown in FIGS. 8a, 8b, 8c. In this mode, a desired information can be obtained through an internet from service companies for which the operator has entry. When this mode is effected, a list-up of information genres is displayed on the multicolored liquid crystal display part 11 as shown in FIG. 8a. In the display of this list-up, a selected information is highlighted by a half-tone dot meshing, and accordingly, by manipulating a scroll touch key displayed on the multicolored liquid crystal display part 11, a selection of a desired information and the scroll of the list-up display can be made, in a manner similar to that explained with reference to FIG. 5b.

At this time, the manipulation key 12a serves as an access key, and accordingly, if, for example, an item "2. Traffic Information" is selected, as shown, the names of service companies for this traffic information is displayed on the see-through liquid crystal display part 10, and accordingly, by manipulating the access key 12a, one of the service companies can be selected. At this time, by touching "sending" key displayed on the multicolored liquid crystal display part 11, it can access the service company, and accordingly, as shown in FIG. 8b, a traffic information provided by the service company can be displayed on the multicolored liquid crystal display part 11.

In the information acquiring mode shown in FIGS. 8a and 8b, when the mode key 13a is manipulated, the operation mode is shifted into a navigation mode shown in FIG. 8c. In this mode, a navigation information can be obtained from a GPS, and a navigation screen can be displayed on the multicolored liquid crystal display part 11. In this case, for example, a navigation information can be selected in accordance with a kind such as "Recommendation", "Nearness", "NEW" or the like. Further, on the see-through liquid crystal display part 10, an azimuth compass for indicating an azimuth at the present position, and a required time up to a shop or a facility in accordance with the above-mentioned kind in a map displayed on the multicolored liquid crystal display part 11 are also displayed.

In each of the modes shown in FIGS. 8a to 8c, if the menu key 14a is manipulated, the operation mode is returned into a portable telephone sending mode.

Although the embodiment of the present invention has been explained, the present invention should not be limited to this embodiment, but may be applied in any other configuration. Further, the kinds of modes and the setting order which can be effected by manipulating the mode key 13a, and the kinds of modes and the setting order which can be effected by manipulating the menu key 14a should not be limited to those in the above-mentioned embodiment.

Further, in the above-mentioned embodiment, the vide camera is provided in the coupling part between the outer casings 1, 2. However, according to the present invention, the position at which the video camera is provided should not be limited to this part, but the vide camera may be provided any other position such as an end part on the outer casing 1 side remote from the coupling part 5. However, even in this case, it goes without saying that an arrangement should be taken such as to enable the direction of the video camera to be changed over a sufficiently wide angular range, and to enable the outer casing 1, 2 to be closed.

What is claimed is:

1. A portable information terminal unit comprising a first and a second casing, each of said first and second casings having a longitudinal proximal end and a longitudinal distal end, hinge means for coupling said first and second casings at the respective longitudinal proximal ends thereof with each other so that said first and second casings are rotatable relative to each other, an opening piercing through said first casing, a see-through first liquid crystal display part fitted in the opening, a second liquid crystal display part provided in said second casing, means for detecting opening of said first and second casings relative to each other, control means for longitudinally reversing an image on said see-through liquid crystal display part in response to a detection by said detecting means, a speaker provided in said first casing near to the distal end thereof, and a microphone provided in said second casing near to the distal end thereof, wherein said see-through first liquid crystal display part and said second liquid crystal display part are overlapped with each other when said first and second casings are closed to each other.

2. A portable information terminal unit as set forth in claim 1, wherein said see-through first liquid crystal display part is a monochromatic liquid crystal display part, and said second liquid crystal display part is a multi-colored liquid crystal display part.

3. A portable information terminal unit as set forth in claim 1, wherein said see-through first liquid crystal display part is superposed over its entirety with a part of said second liquid crystal display part so as to allow the part of said second liquid crystal display part to been seen through said see-through first liquid crystal part when said first and second casings are closed to each other.

4. A portable information terminal unit as set forth in claim 3, wherein said see-through first liquid crystal display part is a monochromatic liquid crystal display part, and said second liquid crystal display part is a multi-colored liquid crystal display part.

5. A portable information terminal unit comprising a first and a second casing, each of said first and second casings having a longitudinal proximal end and a longitudinal distal end, hinge means having a center axis for coupling said first and second casings at the respective longitudinal proximal ends thereof with each other so that said first and second casings are rotatable relative to each other, a video-camera rotatably mounted to said hinge means, an opening piercing through said first casing, a see-through first liquid crystal display part fitted in the opening, a second liquid crystal display part provided in said second casing, means for detecting opening of said first and second casings, relative to each other, control means for longitudinally reversing an image on said see-through liquid crystal display part in response to a detection by said detecting means, a speaker provided in said first casing near to the distal end thereof, and a microphone provided in said second casing near to the distal end thereof, wherein said see-through first liquid crystal display part and said second liquid crystal display part are overlapped with each other when the first and second casings are closed to each other, and said video-camera is rotatable around the center axis of said hinge means independent from said first and second casings for picking up an image which is displayed on said second liquid crystal display part.

6. A portable information terminal unit as set forth in claim 5, wherein said see-through first liquid display part is superposed over its entirety with a part of the second liquid display part so that the part of the second liquid crystal display part can be seen through said see-through first liquid crystal display part.

7. A portable information terminal unit as set forth in claim 5, wherein said see-through first liquid crystal display part is a monochromatic liquid crystal display part, and said second liquid crystal display part is a multi-colored liquid crystal display part.

8. A portable information terminal unit as set forth in claim 5, further comprising means for latching said first and second casings at a predetermined angle, wherein said see-through first liquid crystal display part is used as a finder when said first and second casings are opened from each other, and an image picked up by said video-camera is displayed on said second liquid display part.

9. A portable information terminal unit as set forth in claim 5, wherein characters are displayed on said see-through first liquid display part while an image is displayed on said second liquid display part, and the characters on the see-through first liquid crystal display part and the image on said second liquid crystal display part can be seen being overlapped with each other when the first and second casings are closed to each other.

10. A portable information terminal unit as set forth in claim 6, wherein characters are displayed on said see-through first liquid display part while an image is displayed on said second liquid display part, and the characters on the see-through first liquid crystal display part and the image on said second liquid crystal display part can be seen being overlapped with each other when said first and second casings are closed to each other.

* * * * *